UNITED STATES PATENT OFFICE.

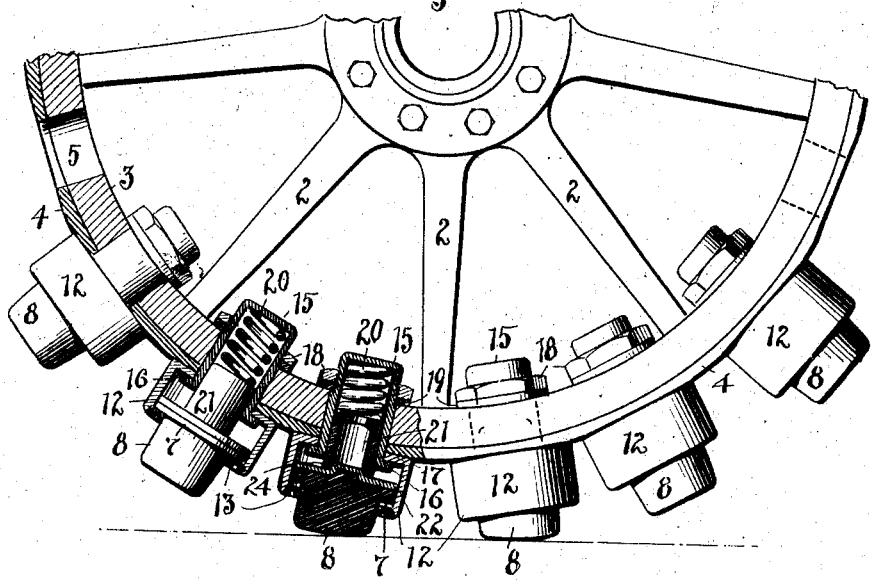

GEORGE O. FANKBONER, OF CLEVELAND, OHIO.

VEHICLE-TIRE.

No. 865,028. Specification of Letters Patent. Patented Sept. 3, 1907.

Application filed October 29, 1906. Serial No. 341,044.

*To all whom it may concern:*

Be it known that I, GEORGE O. FANKBONER, a citizen of the United States, residing at Cleveland, in the county of Cuyahoga and State of Ohio, have invented certain new and useful Improvements in Vehicle-Tires, and do declare that the following is a full, clear, and exact description of the invention, which will enable others skilled in the art to which it appertains to make and use the same.-

My invention relates to vehicle wheels, and the invention consists in a wheel which is so constructed as to provide an effective substitute for the ordinary pneumatic tire so far as resiliency or cushioning effect is concerned, and which has exceptional durability and can be repaired in any portion thereof without affecting the remaining portions of the wheel or tire, all substantially as shown and described and particularly pointed out in the claims.

In the accompanying drawings Figure 1 is a side elevation of a portion of a wheel embodying my invention, and Figs. 2 to 9 inclusive are detail views of the separate parts entering into the construction of the invention, as will hereinafter more specifically appear.

The invention as thus shown is applicable to what may otherwise be regarded as a common form of vehicle wheel having spokes 2, wooden or equivalent felly 3 and steel tire 4, and with width of tread corresponding to the kind of vehicle in which the invention is used, and it may be assumed that an automobile wheel is the type under present consideration.

Now, in carrying out my invention, I employ a special construction of both felly and tire, or modify said parts to adapt my invention thereto in this, a series of holes or openings 5 are formed in or through said felly and the tire at uniform intervals about the same, and in such relatively near relation as to receive the tire units or settings arranged in said holes or openings substantially as shown and constituting together a complete working tire, affording a continuity of tread like tires ordinarily. The said several tire units or members are alike in construction and operation, so that a description of one applies equally to all. Each unit, also, is composed of a perfectly solid rubber shoe 8, Fig. 8, circular in cross section and provided with a flange 7 about its inner edge which is overlapped outside by a spanner ring 13 threaded into so-called cup 12, Fig. 4, adapted to carry the shoe and in which the shoe has more or less play as more or less weight comes thereon in the tread. The said cup or holder for the shoe is fixed rigidly in place against or upon tire 4 by means of socket member 15, Fig. 5, which projects through hole or opening 5 in the wheel rim and has an outer flange 16 overlapping and clamping tightly upon inner flange 17 on cup 12 whereby said cup is rigidly secured to the wheel. The said socket member 15 is preferably closed at its inner end to exclude dust and moisture, and fits snugly in opening 5. In addition said member 15 projects through said opening 5 far enough to fix nut 18 thereon next to felly 3 of the wheel, where an interposed washer 19 may take the immediate bearing of the nut as the said socket member is tightened thereby on the wheel. Thus a casing or shell is formed out of said two rigidly fixed parts 12 and 15 for the other or moving parts of the invention and which are wholly confined within said casing except as shoe 8 projects through the same at the tread of the wheel. Obviously said casing or shell thus constituted of two parts might be made in one part and serve my purpose.

Now, in order to cushion the tire shoes and get therefrom the effect and value substantially of a pneumatic tire, or its equivalent, in general spring effect and ability to absorb impact of obstructions encountered by the wheels, I provide each shoe with a suitable spiral spring 20 located in the bottom of socket 15 and place a preferably hollow plunger 21, Fig. 6, thereon, and which is long enough to project into cup 12 under all conditions of operation. Said plunger is adapted to play within the wall of socket 15 and a disk or plate 22, Fig. 7, is located between said plunger and the inner surface of shoe 8, so that said shoe has its direct bearing against or upon said disk while the disk itself bears against the said plunger. Here again the two parts may be made in one and serve my purpose, and the said two parts 21 and 22 practically constitute the plunger for the shoe and are so regarded herein. The said disk is shown as having a centering projection 24 seated in plunger 21 and this projection may be of still greater length so as to hold the disk against possible tilting in respect to the plunger.

Normally springs 20 will hold shoes 8 relatively as seen at the left in Fig. 1, but when weight comes on the shoes they are pressed inward more or less according to the weight, and the arrangement of the shoes on the wheel is such that at least two will always be down in the tread together and divide the load. Obviously, also, in the spaced separation of the shoes I avoid many obstructions which a continuous tire would encounter, which is an advantage, and the separate or unitary construction of the tire after the manner shown enables me to use parts which in themselves are not easily injured and which can be individually repaired or replaced without changing any other part of the tire.

One reason for making the casing comprising parts 12 and 15, and plunger comprising parts 21 and 22 in two pieces each instead of one, is that I wish to have them as light as is compatible with the service to be rendered, and separate parts enables me to make them of drawn steel, thus keeping down both bulk and weight.

From one point of view my new and improved tire is constituted exclusively by the series of units out of which it is formed and which operatively replace or take the place of a continuous tire like the ordinary pneumatic tire, but from another point of view the rim of the wheel is comprised in the tire as it constitutes an operative part therewith. However, the said units are separate complete articles of manufacture and sale and are supplied to the trade as such. These units of course comprise the shell, the plunger, and the shoe. The shell, as such, has two diameters or is differential in cross section, and is also round or circular in cross section, as shown, and the meeting portions of the shell form shoulders against the tire to take the load. The rim of the wheel referred to herein comprises the felly and the tire.

The construction shown throws all the pressure of the load upon the periphery of the wheel rim so that nut 12 performs no office but to keep the parts securely on the wheel.

Shoe 8 may be entirely of rubber or a rubber cap built upon a metal piece which will fit and slide within cup 12.

What I claim is:

1. In spring cushioned wheel tires, a unitary member comprising a shell of two diameters, a shoe adapted to take the tread of the wheel located in the larger part of said shell and a plunger and spring behind said shoe in the smaller part of the shell, said parts constructed to be removed and replaced together.

2. As a new article of manufacture, a unitary member of a spring cushioned tire consisting of a shell of differential diameters, circular in cross section and having its inner portion externally threaded, a shoe operatively confined in the outer portion of said shell and a spring pressed plunger bearing against said shoe.

3. A unitary member of a spring tire having a shell of two diameters and threaded about its inner portion a shoe removably engaged in the outer portion of said shell and a plunger and spring behind said shoe.

4. A unitary member of a spring tire consisting of a two part shell of different diameters, a shoe confined in the larger of said parts and a spring pressed plunger for the shoe projecting into the smaller of said parts, in combination with a wheel rim having said shoe outside thereof, and means to secure said shell in the rim.

5. An outer wheel rim, shells of two diameters at intervals mounted removably in said rim from the outside and having shoulders bearing against the outside of said rim, and spring shoes mounted in the outer portion of said shells and adapted to yield inwardly under pressure.

6. The wheel rim having a metallic tire about the same, in combination with a series of mountings in said rim comprising differentially shaped shells projecting through the same from the outside and fastened on the inside of the rim, and spring pressed shoes in said shells.

In testimony whereof I sign this specification in the presence of two witnesses.

GEORGE O. FANKBONER.

Witnesses:
R. B. MOSER,
R. A. KETCHAM.